Sept. 29, 1964      E. J. IVES      3,151,249
AUTOMATIC ENGINE STARTING AND STOPPING APPARATUS
Filed June 2, 1960
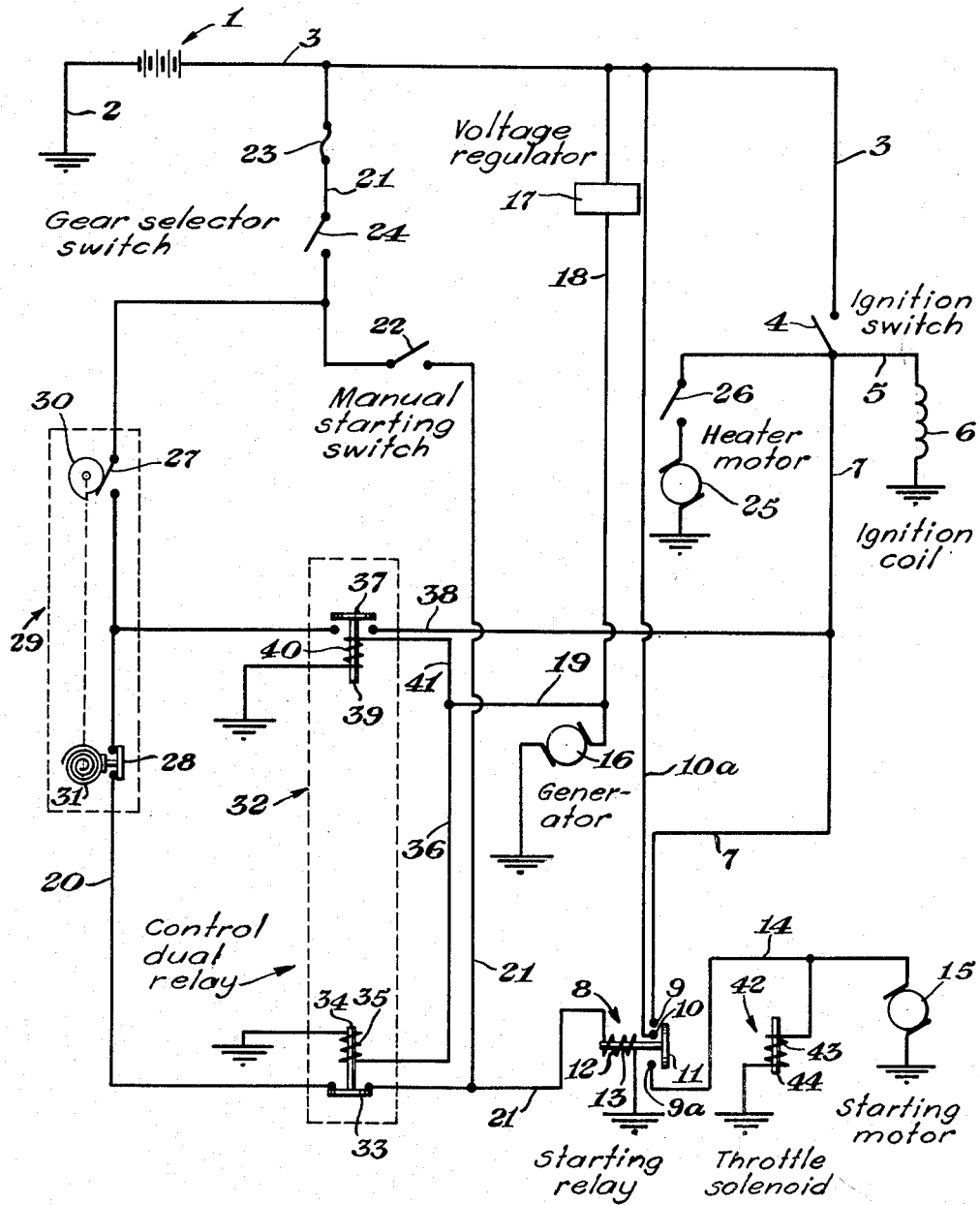
INVENTOR.
Earl J. Ives
BY
Learman, Learman & McCulloch
ATTORNEYS 3,151,249
AUTOMATIC ENGINE STARTING AND
STOPPING APPARATUS
Earl J. Ives, 107 W. Schaefer Road,
Midland County, Mich.
Filed June 2, 1960, Ser. No. 33,524
5 Claims. (Cl. 290—38)

This invention relates to time controlled apparatus for starting and stopping a vehicle engine and more particularly the invention pertains to apparatus capable of effecting cranking of a vehicle engine at a selected time so as to start the engine and subsequently stop it without requiring the presence of an operator.

Various kinds of vehicle engine starting mechanisms have been proposed heretofore for the purpose of starting an engine vehicle independently of an operator at a selected time or whenever the temperature of the vehicle engine reaches a predetermined level. Such mechanisms are particularly advantageous in northern regions, especially in the winter time, inasmuch as they permit an engine to be started prior to the time that the vehicle is to be used, thereby making it possible for the engine to reach operating temperature prior to actual use of the vehicle. Such mechanisms also make it possible for vehicle heating and defrosting apparatus to be set in operation prior to the time the vehicle is to be used, thereby eliminating the necessity of the vehicle operator's having to scrape the windshield and windows and permitting the passenger compartment of the vehicle to be heated prior to the time the operator and passengers enter the vehicle.

An object of this invention is to provide time controlled mechanism for starting the engine of a vehicle at any selected time and to stop the engine after the lapse of a sufficient time to permit the engine to reach operating temperature.

Another object of the invention is to provide apparatus for disabling the engine starting mechanism upon starting of the engine so as to eliminate the possibility of damage to the vehicle's starting motor.

A further object of the invention is to provide automatic engine starting mechanism of the character referred to which may be rendered inoperative after the lapse of a limited time period in the event the engine does not start within such time period.

Another object of the invention is to provide automatic engine starting apparatus that is capable of cranking an engine repeatedly during a limited time period, thereby enabling an engine to be restarted if it should stall within such limited time period.

Another object of the invention is to provide automatic engine starting mechanism which is simple in construction and inexpensive to manufacture and maintain.

Other objects and advantages of the invention will be pointed out in detail or will become apparent from the following description when it is considered in conjunction with the appended claims and the accompanying drawing, which discloses a schematic diagram of apparatus constructed in accordance with the invention and arranged with various components with which automatic vehicles conventionally are equipped.

A conventional automatic vehicle includes a battery 1 having one of its terminals connected by a wire 2 to ground, and its other terminal connected to a wire 3 leading to an ignition switch 4 that may be opened or closed under the control of an ignition key. Connected to the ignition switch is one end of a wire 5, the other end of which is connected to one terminal of an ignition coil 6. The opposite terminal of the coil 6 is connected to ground, as is conventional.

Also connected to the ignition switch 4 is a wire 7 that leads to a starting relay 8 having a pair of normally open contacts 9 and 9a that are adapted to be closed by a bar 11 which is fixed to the armature 12 of the relay. The relay armature is positioned within a coil 13. Also included in the relay is a contact 10 that is connected to the battery via a wire 10a. From the relay 8 extends a conductor 14 that is connected to one terminal of a starting motor 15 which is operable, when energized, to crank the engine of the vehicle. The opposite terminal of the motor 15 is connected to ground.

Also forming part of the conventional vehicle engine apparatus is a generator 16 that is connected through a voltage regulator 17 to the battery by means of the conductor 18. The generator also is connected by a conductor 19 for a purpose to be described.

Normally, the coil 13 of the starting relay 8 is connected by a wire 21 to the battery through a starting switch 22 and a fuse 23 and, in most cases where the vehicle is provided with automatic transmission, the conductor 21 also includes a gear selector lever controlled switch 24. The switch 24 normally is open in all positions of the transmission control lever except neutral or an equivalent position in which the transmission is disengaged to prevent starting of the vehicle except when the transmission is disengaged.

The modern vehicle conventionally includes a heater motor 25 having one of its terminals grounded and its other terminal connected to the ignition switch through a manually controllable switch 26. The motor 25 normally operates blowers for a heater and a defroster unit which function to direct warm air into the vehicle passenger compartment and against the vehicle windshield in the usual manner.

Apparatus constructed in accordance with the invention includes a pair of spring biased switches 27 and 28 mounted in a conductor 20 having its opposite ends connected to the wire 21 so as to be in circuit with the starting relay 8. The switches 27 and 28 preferably form part of a clock mechanism 29 which may comprise a mechanical alarm clock, for example, of known construction. The clock includes a manually settable cam or other alarm releasing device 30 that is movably supported adjacent the switch 27 so as to close the latter at a predetermined time and maintain it closed for a limited period of time, such as twenty minutes. The clock 29 also may include a manually windable spring or similar device 31 adjacent the switch 28 and which begins to unwind automatically in response to the member 30 being moved to its alarm releasing position. Unwinding of the spring 31 causes the latter to bear against the switch 28 and open the latter after a predetermined interval of time, such as 20 seconds.

Mechanism constructed according to the invention also includes a dual relay device 32 comprising a normally closed switch 33 in the line 20 and connected to an armature 34 that is mounted within a winding 35. One end of the winding 35 is grounded and the other end is connected by a wire 36 to the generator wire 19. The dual relay 32 also includes a normally open switch 37 in a conductor 38 that is connected at one end to the wire 20 between the switches 27 and 28 and which is connected at its other end to the wire 7 that leads to the starting relay. The switch 37 is connected to an armature 39 that is mounted within a coil 40. One end of the coil 40 is grounded and its other end is connected by a wire 41 to the generator wire 19.

When a vehicle operator starts a cold engine, he normally advances the engine throttle so as to set the automatic choke with which most modern vehicles are equipped. Apparatus constructed according to the invention preferably includes a throttle solenoid 42 comprising a winding 43 that is connected at one end to the wire 14 and at its other end to ground, and within which is mounted an armature 44 that may be connected to the vehicle throttle mechanism in such manner as to advance the throttle upon energization of the solenoid 42.

Preparatory to the operation of the engine starting apparatus, the vehicle operator sets the clock mechanism so as to effect closing of the switch 27 at a predetermined time, winds the spring 31 so as to permit the switch 28 to close, and closes the switch 24 by shifting the gear selector lever to its neutral or equivalent position. On vehicles not provided with a gear selector switch 24 there preferably should be provided a similar switch which will be closed when the gear selector lever is in its neutral position.

At the time selected for operation of the clock mechanism 29, the member 30 will have been moved by the operation of the clock to a position to close the switch 27. Closing of the switch 27 connects the starting relay 8 in circuit with the battery 1 through the switches 24, 27, 28 and 33 so as to energize the starting relay and effect closing of the switch 11. Closing of the switch 11 energizes the solenoid 42 to advance the throttle and also energizes the starting motor 15 to effect cranking of the vehicle engine. Closing of the switch 11 also connects the ignition coil 6 in circuit with the battery so as to condition the ignition system for firing.

Simultaneously with the movement of the member 30 to effect closing of the switch 27, the spring 31 will commence to unwind, but it will not open the switch 28 immediately. A relatively short period of time must elapse before the spring engages and opens the switch 28.

In the event the vehicle engine starts prior to the time the switch 28 is opened, the generator 16 will be driven in the conventional manner so as to energize the dual relay 32. Energization of the dual relay will effect closing of the switch 37 and opening of the switch 33. Opening of the switch 33 de-energizes the starting relay 8, thereby disabling the starting motor 15 to eliminate the risk of injuring the latter by operating it as the vehicle engine is running. Closing of the switch 37 maintains the ignition coil in circuit with the battery so as to permit firing of the engine to continue.

After a sufficient period of time has elapsed to permit the spring 31 to unwind, the switch 28 will be opened, thereby preventing any further energization of the starting motor 15 through the clock mechanism 29.

In the event the engine should start, run for a few moments, and then stall, as frequently happens when attempting to start a cold engine in cold weather, the stopping of the engine will discontinue driving of the generator, thereby de-energizing the dual relay 32 and permitting the switches 33 and 37 to close and open, respectively. If the switch 28 has not been opened by the spring 31, the starting relay 8 again will be energized so as to effect energization of the starting motor 15 in the same manner as previously has been described so as once again to crank the engine. This operation may be repeated for as long as the switch 28 remains closed. Once the switch 28 opens, however, it is not possible to energize the starting motor 15 except upon closing of the starting switch 22 under the control of the vehicle operator. Consequently, the automatic starting mechanism will not continue to effect cranking of the engine indefinitely and thereby drain the battery.

After the engine has started and run continuously for the period of time permitted by the operating member 30, the latter will be moved by the clock mechanism to such position as to permit opening of the switch 27, thereby disconnecting the ignition system from the battery and stopping the engine. Thus, the automatic starting mechanism also automatically effects stopping of the engine after a predetermined period of time.

If the switch 26 that controls the heater motor 25 has been left in its closed position, the heater motor will operate as long as the ignition circuit is energized, thereby enabling the heater and defroster to operate during the running of the engine. Thus, it not only is possible to effect warming of the engine, but also to effect warming of the passenger compartment and defrosting of the windows.

In the event the vehicle operator desires to drive the vehicle prior to the time the clock mechanism stops the engine, he may close the ignition switch 4, shift the gear selector so as to open the switch 24, and thereby disable the engine starting mechanism.

Inasmuch as operation of the vehicle engine under the control of the automatic starting mechanism requires the gear selector switch 24 to be closed, it is not possible for any unauthorized person to drive the vehicle away, even though the engine may be running. That is, movement of the gear selector lever to such position as to effect engagement of the transmission will open the switch 24 and thereby disable the automatic starting mechanism. Thus, no one will be able to drive the vehicle unless he is able to close the ignition switch 4.

The disclosed embodiment is representative of the presently preferred form of the invention, but it is intended to be illustrative rather than definitive thereof. The invention is defined in the claims.

I claim:

1. Starting apparatus for an automobile engine having an electric circuit including a battery, a generator, ignition means, and a starting motor, said apparatus comprising normally de-energized relay means adapted when energized to connect said starting motor in circuit with said battery and said ignition means; a pair of normally open switches in circuit with said normally open relay means and adapted when closed to connect said relay means to said battery; time controlled operating means for closing said switches to energize said relay means and for subsequently opening said switches; a normally closed switch device in circuit with said relay means; a normally open switch device in circuit with said ignition means and one of said normally open switches and adapted when closed to connect said ignition system in circuit with said battery; and control means in circuit with said generator and operable in response to operation thereof to open said normally closed switch device to disconnect said starting motor from said battery and to close said normally open switch device.

2. Apparatus as set forth in claim 1 wherein said control means comprises a pair of electromagnetic devices connected in parallel and the parallel combination in series with said generator.

3. Apparatus as set forth in claim 1 wherein said one of said switches is opened by said time controlled operating means after the opening of the other of said switches.

4. Starting apparatus for a vehicle engine having an electric circuit including a battery, a generator, ignition means, a starting motor, and normally deenergized relay means for operating said starting motor, said apparatus comprising a pair of switches connected in series with said battery and said relay means; a pair of switch devices, one of which is normally closed and connected in series with said relay and with both switches of said pair of switches and the other of which is normally open and connected to said ignition means in parallel with said one switch device and one switch of said pair of switches, and connected in series with the other switch of said pair of switches; control means in circuit with said generator and operable in response to operation thereof to close said normally open switch device and open said normally closed switch device; and time controlled means acting on the switches of said pair of switches and operable to effect simultaneous closing thereof for a limited period of time and to effect opening of said one switch of said pair of switches upon the lapse of said limited period of time.

5. The apparatus set forth in claim 4 wherein said time controlled means operates to open the other switch of said pair of switches upon the lapse of a period of time in addition to said limited period of time.

References Cited in the file of this patent

UNITED STATES PATENTS

| | | |
|---|---|---|
| 1,176,960 | Hall | Mar. 28, 1916 |
| 2,748,759 | Schiffer | June 5, 1956 |
| 2,952,782 | Woyden | Sept. 13, 1960 |
| 2,975,296 | Dominguez-Rego | Mar. 14, 1961 |